United States Patent [19]

Kuhn

[11] 4,120,365

[45] Oct. 17, 1978

[54] TRACK ELIMINATOR APPARATUS

[76] Inventor: Leo A. Kuhn, 225 Clark Ave., Harvey, N. Dak. 58341

[21] Appl. No.: 791,796

[22] Filed: Apr. 28, 1977

[51] Int. Cl.$^2$ .......................................... A01B 63/102
[52] U.S. Cl. .................................... 172/488; 172/676
[58] Field of Search ............. 172/134, 291, 451, 474, 172/478, 482, 485, 488, 489, 649, 650, 656, 676, 619, 646, 677; 111/61, 7, 59, 60, 62, 63, 64, 65, 66, 67

[56] References Cited

U.S. PATENT DOCUMENTS

| | | | |
|---|---|---|---|
| 751,314 | 2/1904 | Lindgren | 172/656 |
| 1,358,650 | 11/1920 | Pendleton | 172/482 |
| 1,422,967 | 7/1922 | Griswold et al. | 172/134 |
| 1,604,721 | 10/1926 | Riepe | 172/676 |
| 1,707,410 | 4/1929 | Neusiis | 172/676 |
| 1,917,944 | 7/1933 | Langdon | 172/482 |
| 2,227,774 | 1/1941 | Ahrens | 172/134 |
| 2,277,880 | 3/1942 | Noble | 172/134 |
| 2,533,150 | 12/1950 | Steffen | 172/676 X |
| 3,001,590 | 9/1961 | Tsuchiya | 172/451 |
| 3,106,254 | 10/1963 | Clark | 172/474 |
| 4,014,271 | 3/1977 | Rohlf et al. | 111/7 |

FOREIGN PATENT DOCUMENTS 2,410,290 9/1974 Fed. Rep. of Germany ........... 172/134
2,302,010 9/1976 France ..................................... 172/676

Primary Examiner—Richard T. Stouffer

[57] ABSTRACT

Track eliminator apparatus mountable on a tractor to be between the tractor and the grain box of a grain drill for breaking up the soil compacted by the tractor rear wheels. The track eliminator apparatus includes clamp members that are mounted on the tractor axle and pivotally mount draw arms. The draw arms mount left and right sub frames that are transversely adjustable connected by cross bars to provide a generally downwardly opening U-shaped space through which the grain drill tow bar is extended. Ground engaging spring teeth are mounted by the sub frames. A piston cylinder combination is connected between the tractor and one of the cross bars for moving the sub frames between a spring tooth ground engaging position and an elevated travel position.

6 Claims, 2 Drawing Figures

TRACK ELIMINATOR APPARATUS

BACKGROUND OF THE INVENTION

Track eliminator apparatus mountable on a tractor for breaking up soil compacted by wheels of a tractor.

In the prior art it is old to provide an attachment for a tractor that can be used to eliminate tractor wheel tracks, for example, see U.S. Pat. Nos. 2,675,752 and 2,321,464, while U.S. Pat. No. 2,658,438 disclose an attachment for a tractor that in part is mounted thereon by being clamped to the tractor rear axle and a piston cylinder combination which also is usable for operating a part of the attachment to elevate the agricultural implements attached thereto. In order to provide track eliminator apparatus that is easily mounted on and removed from a tractor, sturdy and lightweight, and does not interfere with the grain drill when turning, this invention has been made.

SUMMARY OF THE INVENTION

Track eliminator apparatus for breaking up ground compacted by tractor wheels.

Track eliminator apparatus mounted on a tractor that includes a pair of sub frames, each of which mounts ground engaging tools behind one of the tractor rear wheels and has uprights adjacent the uprights of the other, means for connecting the upper ends of the uprights while maintaining the uprights of one sub frame substantially transversely spaced from the other, draw bar means for each sub frame pivotally mounted on the tractor for connecting the respective sub frame to the tractor and piston cylinder means pivotally mounted on the tractor for moving the means connecting the uprights between a tool ground engaging position and an elevated travel position.

One of the objects of this invention is to provide new and novel means mountable on a tractor for breaking up ground compacted by the tractor rear wheels while permitting a grain drill tow bar being connected to the tractor and not interfering with the grill drill while turning.

Figure 1:
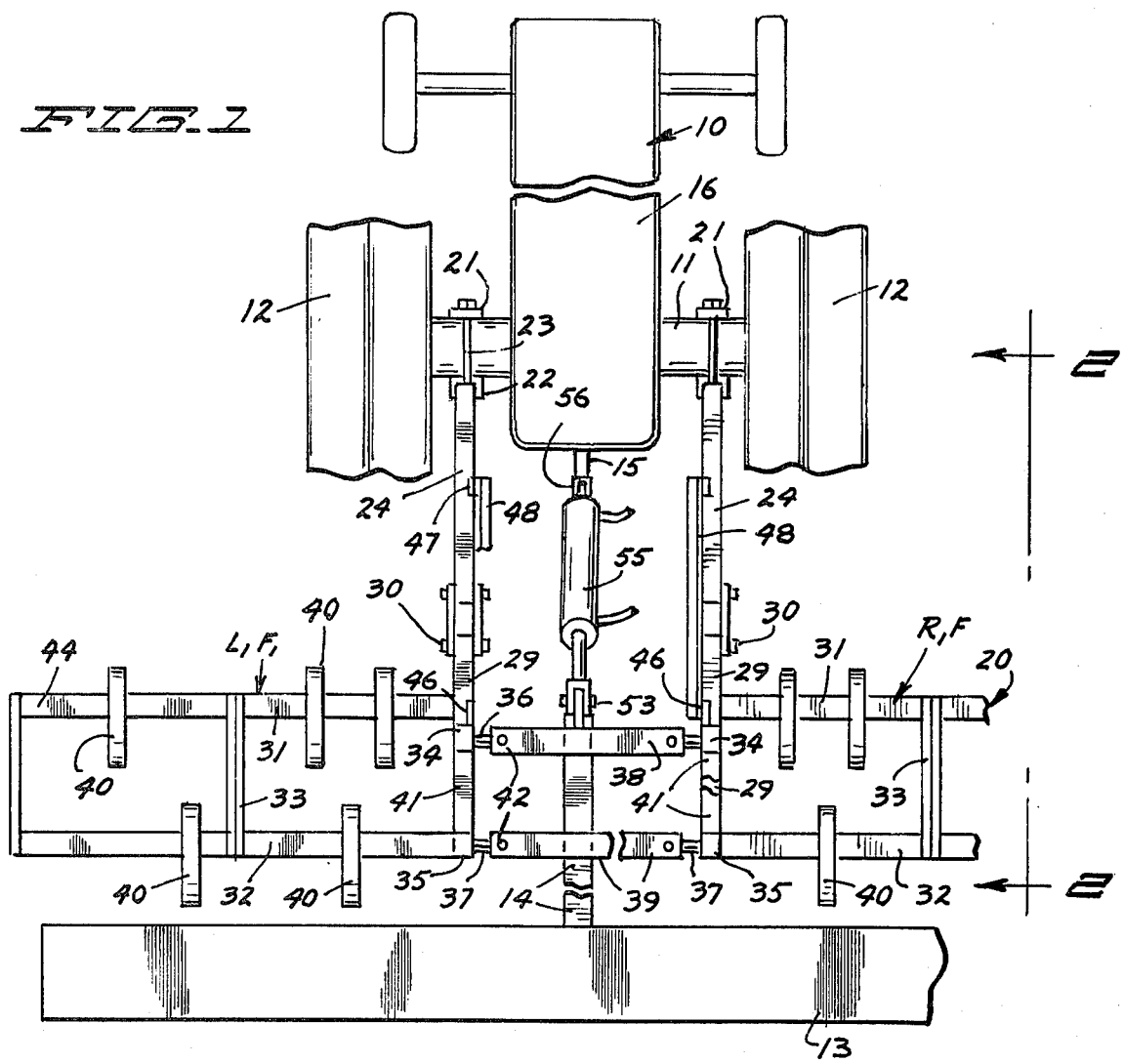
FIG. 1 is a fragmentary diagramatic representation of a tractor and grain drill in plan view, and a fragmentary plan view of the track eliminator apparatus of this invention attached to the tractor.

Referring now to the drawings, a tractor 10 has a rear axle 11, rear wheels 12 on either side of the main body portion 16 of the tractor, and a tractor draw bar 15. The draw bar 14 of a grain drill 13 is suitably pivotally connected to the draw bar 15 or another portion of the tractor frame to be towed thereby.

Figure 2:
FIG. 2 is an end view of the track eliminator apparatus of this invention in a working position, said view being generally taken along the line and in the direction the arrows 2—2 of FIG. 1.

The track eliminator apparatus of this invention, generally designated 20, includes on each side of the main body 16 of the tractor, a front axle bracket 21, a rear axle bracket 22 and bolts 23 for bolting the axle brackets to the axle, members 21–23 forming axle clamp brackets. To each of the axle brackets 22 there is pivotally attached the front end of a draw arm 24 by a bolt 26. As may be noted in FIG. 2, there are provided vertically spaced apertures 27 in the axle brackets 22 so that the front end of the draw bars may be connected to the axle brackets by bolts 26 in selected vertical positions. The rear end of each draw arm is bolted at 30 to the front end of the respective longitudinally elongated bottom frame member 29. Frame members 29 are at the same elevation and parallel to one another.

One frame member 29 forms a part of an attachment sub-frame, generally designated L.F. while the other frame member 29 forms a part of an attachment sub-frame generally designated R.F. It is to be noted that these sub-frames are of the same construction other than one is a left-hand sub-frame and the other is a right-hand sub-frame. Each of these sub-frames includes a transversely elongated frame member 31 that is joined to the respective frame member 29 to extend outwardly thereof at a location longitudinally intermediate its opposite ends and a rear transverse frame member 32 that is joined to the rear end of frame member 29 to extend transversely outwardly thereof. The outer end of frame members 31 and 32 are connected by a longitudinal end frame member 33.

The lower end of an upright 34 is joined to the respective frame member 29 just rearwardly of the juncture of the frame member 31 thereto while the lower end of an upright 35 is joined to the rear end of frame member 29. Uprights 34, 35 are of the same length and are parallel to one another. Extending between and joined to the upper ends of each pair of uprights 34, 35 is an upper longitudinal frame member 41.

Joined to the upper end of each of the uprights 34 to extend inwardly toward the other is an upper transverse frame member 36 while an upper transverse frame member 37 is likewise joined to the upper ends of each of uprights 35. The frame members 36 telescopically extend into a front cross bar 38, the frame members 36 having transversely spaced apertures (not shown) extending therethrough whereby bolts 42 secure frame members 36 to the cross bar in telescopically transversely adjusted positions. Likewise, the frame members 37 telescopically extend into the rear cross bar 39 to be bolted thereto in telescopically transversely adjusted positions. It is to be noted that frame members 36, 37 and cross bars 38 and 39, are at a substantially higher elevation than frame members 31, 32 whereby these members provided a generally U-shaped, downwardly opening space. Thus, cross bars 38, 39 serve to connect the frames L.F. and R.F. while leaving a structurally free space there beneath for having the grain drill tow bar extended therethrough. Further frame member 36, 37 are parallel to and on the opposite sides of the uprights from frame members 31, 32 of the same sub-frame.

One or more ground engaging spring teeth 40 are mounted on each transverse frame member 31 in transverse spaced relationship while one or more spring teeth 40 are also mounted on each transverse frame member 32 to be transversely offset from the teeth on the front frame member. In the event that frame members 31, 32 are not of sufficient transverse dimensions for mounting spring teeth to be located for breaking the ground the entire transverse width of the rear wheels 12, open rectangular extension frames 44 are provided and have their end frame members bolted to the adjacent end frame member 33 to extend transversely outwardly thereof. Additional spring teeth 40 may be mounted on the front and rear frame members of the extension frame 44.

To the longitudinally intermediate portion of each of the draw arms 24 there is joined an upwardly extending lug 47 while to an intermediate portion of each of the uprights 34 there is joined a forwardly extending lug 46. The front end of the draw arm brace 48 is bolted at 50 to lug 47 while the opposite end is bolted at 49 to lug 46.

To the intermediate portion of cross bar 38 there is joined a forwardly extending lug 52 which is pivotally connected at 53 to the piston rod 54 of a two way acting piston cylinder combination 54, 55. The piston cylinder includes a cylinder 55 that is pivotally connected at 57 to a tractor draw bar clamp 56 to be pivotable about a transverse pivot axis.

In using the apparatus of this invention, the axle clamp brackets 21–23 are mounted on the axle 11 on either side of the tractor main body while the cylinder clamp bracket 56 is clamped to the tractor draw bar. Prior to clamping the axle brackets to the axle, frame members 36, 37 are appropriately transversely adjusted in the cross bars 38, 39 and bolted thereto, this adjustment depending on different axle and cab types of the tractor being used. The grain drill tow bar 46 is extended beneath the cross bars 38, 39 to be located transversely intermediate frame members 29 and is pivotally connected to the tractor draw bar or another portion of the tractor in a conventional manner whereby the grain drill box is located rearwardly of the track eliminator apparatus of this invention. The connection of the tow bar to the tractor is forwardly of the sub-frames. Due to the transverse spacing of the draw arms 24, the longitudinal frame members 29 and the uprights 34 and 35 of the respective frame from one another, and that there is no structure of the apparatus 20 that extends transversely between said members other than members 36–39 which are located at a substantially higher elevation than frame members 29 and draw bar 14, the tractor can make turns while pulling the grain drill without the track eliminator apparatus abutting against the grain drill draw bar. Additionally in using the apparatus of this invention, the spring teeth 40 are appropriately transversely adjustably spaced so as to break all the ground of the tracks left by the tractor rear wheels.

To move the spring teeth 40 from the ground breaking position to an elevated travel position, fluid under pressure is applied to the lower end of the cylinder 55 whereby pivot 53 is moved arcuately upwardly in a forward direction. This results in the draw arms 24 pivoting in the direction of the arrows 60 about the transverse pivot axes of bolts 26, and as long as fluid under pressure is applied to the lower end of the cylinder, the spring teeth are retained in the elevated travel position.

It is to be understood that depending on the construction of the tractor, clamp brackets 22 may be bolted to other parts of tractor in place of being clamped to the axle and the bracket 56 may be bolted to the tractor frame in a position that when fluid under pressure is applied to the cylinder, the spring teeth will be moved to an elevated travel position.

Whether or not the open frames 44 are used would depend upon the width of the rear tractor wheels.

What is claimed is:

1. In combination with a tractor having a rear axle, transversely opposite rear wheels and hitch mechanism between the rear wheels, track eliminator apparatus comprising a first and second elongated draw bar having a first end and a second end, first clamp means pivotally connected to the first draw bar first end for connecting the first draw bar to the axle, second clamp means pivotally connected to the second draw bar first end for connecting the second draw bar to the axle to extend on the transverse opposite side of the hitch mechanism from the first draw bar, a first and second sub-frame, means for connecting the first draw bar second end to the first sub-frame, means for connecting the second draw bar second end to the second sub-frame, each sub-frame having a longitudinally extending bottom frame member, a bottom transverse frame member joined to the longitudinal bottom frame member to extend outwardly therefrom in a direction away from the other sub-frame, an upright having a lower end joined to the longitudinal frame member, and an upper end at a subtantially higher elevation than its lower end, a second upright having a lower end joined to the longitudinal frame member of the same sub-frame more remote from the draw bar than the first mentioned upright and an upper end, a brace joined to the upper ends of the uprights of the same sub-frame, and a second bottom transverse frame member joined to the longitudinal frame member of the same sub-frame to extend transversely outwardly therefrom in a direction away from the other sub-frame, means for joining the sub-frames at about the elevation of the uprights upper ends to provide a downwardly opening structural free space of a substantial transverse dimension between the uprights and longitudinal frame members, a piston cylinder combination having a piston rod and a cylinder, means for pivotally connecting the piston rod to the means for joining the sub-frames, means for pivotally connecting the cylinder to hitch mechanism and means dependingly mounted on each sub-frame for breaking ground, said combination being operative for moving the means joining the sub-frames between a ground breaking means elevated travel position and a ground breaking means ground breaking position, means mounted on the second bottom transverse frame members for breaking ground, and means at about the same elevation as and longitudinally remote from the above mentioned means joining the sub-frames for joining the sub-frames.

2. The apparatus of claim 1 further characterized in that each of said draw arms and uprights has a mid portion and that there is provided for each sub-frame a draw brace having a first end connected to the respective sub-frame upright mid portion and a second end connected to the draw arm mid portion of the draw arm that is connected to the same sub-frame.

3. The apparatus of claim 1 further characterized in that the ground breaking means comprises spring tools, and that there is provided for each sub-frame an extension frame that is mounted thereon to extend more transversely remote therefrom than the other sub-frame, and means for breaking the ground mounted on the extension frames.

4. In combination with a tractor having a rear axle, transversely opposite rear wheels and hitch mechanism between the rear wheels, track eliminator apparatus comprising a first and second longitudinally extending bottom frame member that is parallel to the other, each longitudinal bottom frame member having a first end and a second end, for each bottom longitudinal frame member at least one upright, each upright having a lower end joined to the respective longitudinal bottom frame member and an upper end at a substantially higher elevation than the bottom frame members, means extending transversely between the longitudinal bottom frame members only at about the elevation of the upper ends of the uprights for connecting each upright on one bottom longitudinal frame member to the other to through the uprights retain the longtiudinal bottom frame members substantially transversely spaced from one another, first draw bar means pivotally mounted on the tractor for connecting the first frame member to the tractor, second draw bar means pivotally mounted on the tractor in substantial transverse spaced relationship to the first draw means for connecting the second frame member to the tractor, a first plurality of earth breaking tools, a second plurality of earth breaking tools, first transversely extending frame means for mounting the first plurality of tools rearwardly of one of the rear wheels, second transversely extending frame means for mounting the second plurality of tools rearwardly of the other of the rear wheels, said first frame means being joined to the first frame member to extend transversely outwardly thereof in a direction away from the second frame member, the second frame means being joined to the second frame member to extend transversely outwardly thereof in a direction away from the first frame member, and a piston cylinder combination pivotally mounted on the tractor transversely between the first and second draw bar means and pivotally connected to the means connecting the uprights for moving the last mentioned means between a tool ground breaking position and a tool elevated ground travel position, and a grain drill having a grain box longitudinally on the opposite side of the ground engaging tools from the tractor and a tow bar extending beneath the means connecting the uprights and connected to the tractor.

5. The apparatus of claim 4 further characterized in that the means extending between the uprights includes means of a transversely adjustable dimension to permit transversely adjustably spacing the bottom frame members.

6. In combination with a tractor having a rear axle, transversely opposite rear wheels and hitch mechanism between the rear wheels, tractor eliminator apparatus comprising a first sub-frame, a second sub-frame, each sub-frame having a longitudinally extending bottom frame member, a first bottom transverse frame member joined to the longitudinal bottom frame member to extend outwardly therefrom in a direction away from the other sub-frame, an upright having a lower end joined to the longitudinal frame member, and an upper end at a substantially higher elevation than its lower end, a second upright having a lower end joined to the longitudinal frame member of the same sub-frame longitudinally remote from the first mentioned upright and an upper end, a brace joined to the upper ends of the uprights of the same sub-frame, and a second bottom transverse frame member joined to the longitudinal frame member of the same sub-frame to extend transversely outwardly therefrom in a direction away from the other sub-frame, means for joining the sub-frames at about the elevation of the uprights upper ends to provide a downwardly opening structural free space of a substantial transverse dimension between the uprights and longitudinal frame members, first draw bar means pivotally mounted on the tractor for connecting the first sub-frame to the tractor, second draw bar means pivotally mounted on the tractor in substantial transverse spaced relationship to the first draw bar means for connecting the second sub-frame to the tractor, means dependingly mounted on the first bottom transverse frame members for breaking ground, means dependingly mounted on the second bottom transverse frame members for breaking ground, a piston cylinder combination having a piston rod and a cylinder, means for pivotally connecting the piston rod to the means for joining the sub-frames, and means for pivotally connecting the cylinder to the tractor, said combination being operative for moving the means joining the sub-frames between a ground breaking means elevated travel position and a ground breaking means ground breaking position.

* * * * *